(12) United States Patent
D'Silva et al.

(10) Patent No.: US 8,972,112 B2
(45) Date of Patent: Mar. 3, 2015

(54) ALGORITHM FOR ESTIMATION OF TIE-ROD LOADS

(75) Inventors: Siddharth H. D'Silva, Rochester Hills, MI (US); Jon D. Demerly, Byron, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 236 days.

(21) Appl. No.: 13/565,324

(22) Filed: Aug. 2, 2012

(65) Prior Publication Data

US 2014/0039762 A1 Feb. 6, 2014

(51) Int. Cl.
*B62D 6/00* (2006.01)

(52) U.S. Cl.
USPC ............................................ 701/42; 180/446

(58) Field of Classification Search
USPC ................ 701/42, 22, 36, 48, 66, 69, 41; 180/65.265, 65.27, 65.275, 443, 446
See application file for complete search history.

(56) References Cited

U.S. PATENT DOCUMENTS

| | | | |
|---|---|---|---|
| 6,954,691 B2 * | 10/2005 | Roll et al. ........................ 701/70 |
| 7,165,465 B2 * | 1/2007 | De Lair et al. ........... 73/862.326 |
| 7,273,127 B2 * | 9/2007 | Pick et al. ...................... 180/446 |
| 8,150,582 B2 * | 4/2012 | Blommer et al. ............... 701/44 |
| 2002/0050417 A1 | 5/2002 | Berg et al. |
| 2007/0144824 A1 | 6/2007 | Tamaki et al. |
| 2012/0283910 A1 | 11/2012 | Lee et al. |

OTHER PUBLICATIONS

Liu et al.; "On Torque Control of Vehicle Handling and Steering Feel for Avoidance Maneuver with Electric Power Steering"; Jul. 11, 2008; Proceedings of the 17th World Congress; the International Federation of Automatic Control; pp. 12073-12078.

* cited by examiner

*Primary Examiner* — Dalena Tran
(74) *Attorney, Agent, or Firm* — Cantor Colburn LLP

(57) ABSTRACT

A steering control method is provided. The method includes determining a dynamic load on a steering system based on a dynamic model; and controlling the steering system based on the dynamic load.

18 Claims, 6 Drawing Sheets

ALGORITHM FOR ESTIMATION OF TIE-ROD LOADS

FIELD

The present invention relates generally to systems and methods of estimating a load associated with a steering system.

BACKGROUND

Steering control systems have traditionally relied on sensors for inputs such as hand wheel angle, driver torque, and vehicle speed. However, some parameters that affect the steering system are neither sensed nor estimated for the purposes of control due to the cost and difficulty of implementation. One example is the load at the steering system rack.

The load at the rack not only affects vehicle centric behavior, for example, free control and return, but also impacts the overall steering feel. The rack load is a highly nonlinear, highly dynamic, vehicle speed sensitive function of the rack position, thus, making it complicated to estimate. Control methods that treat the vehicle as a simple stiffness (and hence rack load as a gain times rack position) lack capturing the dynamic nature of the steering-chassis linkage.

SUMMARY

In one exemplary embodiment, a steering control method is provided. The method includes determining a dynamic load on a steering system based on a dynamic model; and controlling the steering system based on the dynamic load.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

DETAILED DESCRIPTION

Figure 1:
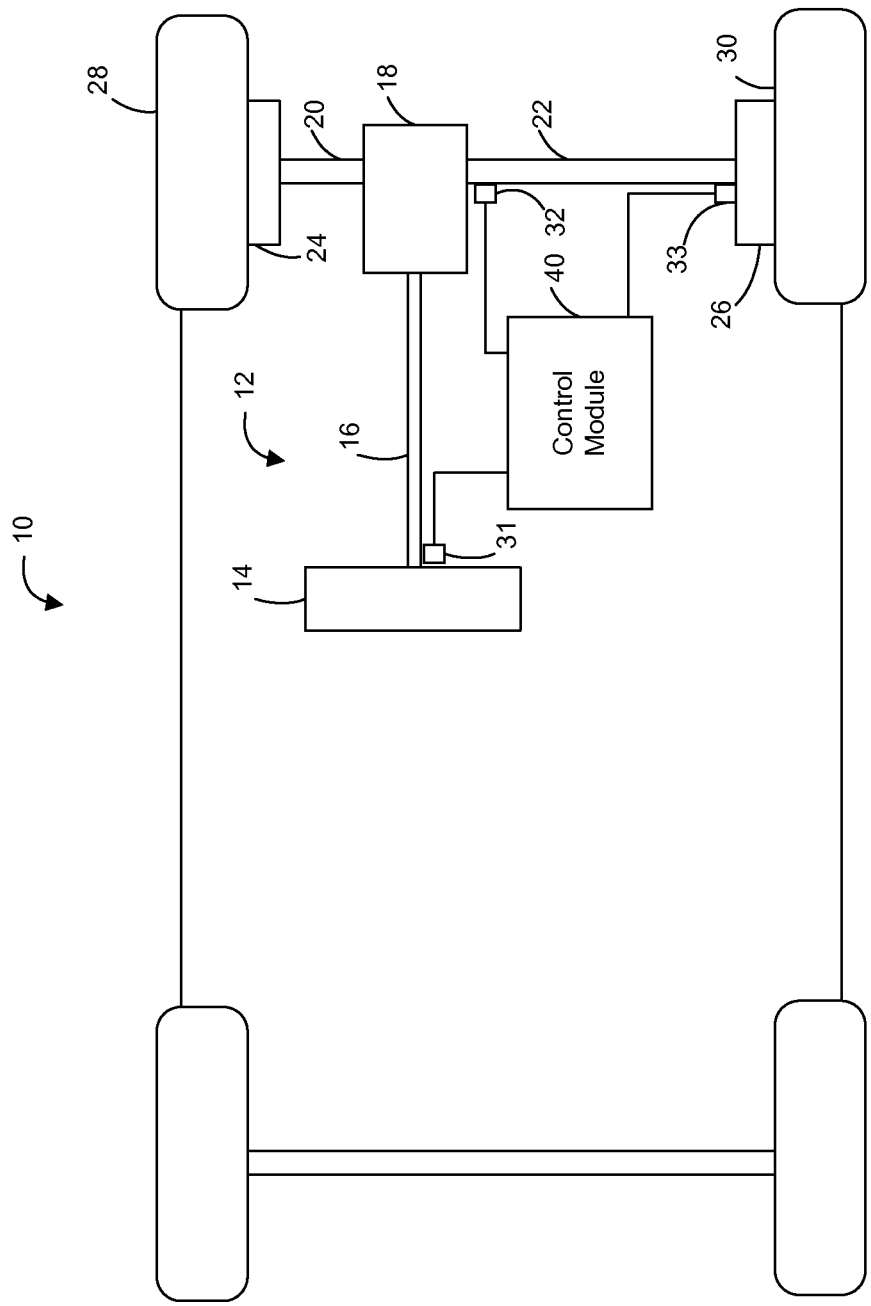
FIG. 1 illustrates a functional block diagram of an exemplary vehicle including a controlled steering system in accordance with various embodiments.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31, 32 that detect and measure observable conditions of the steering system 12 and/or of the vehicle 10. The sensors 31, 32, 33 generate sensor signals based on the observable conditions. In various embodiments, the sensors 31, 32, 33 can include, for example, position sensors, a vehicle speed sensor, or a combination thereof.

In various embodiments, a control module 40 controls the operation of the steering system 12 and/or the vehicle 10 based on one or more of the sensor signals and further based on the steering control systems and methods of the present disclosure. Generally speaking, the steering control systems and methods of the present disclosure estimate a load on the steering system from the vehicle chassis. In particular, the steering control systems and methods estimate a load on the rack of the steering system 12. In various embodiments, the steering control systems and methods estimate the load based on a dynamic bicycle model of the vehicle 10. As can be appreciated, various functions can be applied in addition to the bicycle model to improve the overall estimation of the load.

In various embodiments, the load can be estimated based on the following relationship:

$$\frac{T_L(s)}{x_r(s)} = \underbrace{\frac{\tilde{G}}{N_{str}}}_{1} * \underbrace{\frac{\overline{F}_f(s)}{\delta(s)}}_{2} * \underbrace{\frac{1+\alpha\tau s}{1+\tau s}}_{3}. \qquad (1)$$

Part 1 of the above equation represents a steady-state gain function. Part 2 of the above equation represents a normalized vehicle transfer function which provides magnitude attenuation with frequency and all the required phase-characteristics. Part 3 of the above equation represents a phase-lead compensator that, by design, has a unit steady-state gain.

More specifically, the symbol $T_L$ denotes the rack load in column coordinates. The symbol $x_r$ denotes the rack position in column coordinates. The symbol $N_{str}$ denotes the overall steer ratio. The symbol $\tilde{G}$ denotes a steady-state gain function, where:

$$\tilde{G} = G * \frac{Ff}{\delta}\bigg|_{s=0}. \qquad (2)$$

The symbol G denotes an effective torque gradient. The symbol $F_f$ denotes the lateral force at the front axle. The symbol $\delta$ denotes the road wheel angle. The symbols $\alpha$ and $\tau$ denote parameters of a first order phase-lead compensator.

In various embodiments, the values of $$\frac{F_f(s)}{\delta(s)}, \tau,$$

and α can be a function of vehicle speed. In various embodiments, the steady-state characteristics that are represented by G can be captured as a nonlinear, vehicle speed dependent tabular function.

Provided the relationship in equation (1), a model is established that evaluates the steady-state characteristics and dynamic characteristics separately to estimate the load. The estimated load can then be used to control the steering system 12 and/or the vehicle 10.

As can be appreciated, other variations of the relationship in equation (1) are contemplated to be within the scope of the invention. Such variations may alter the implementation of the model. For example, a model can be implemented based on Part 2 using a bicycle model that is not normalized. In another example, a model can be implemented based on Part 2 and Part 3 using a bicycle that is not normalized. In yet another example, a model can be implemented based on Part 1 and Part 2 using a normalized bicycle model.

Referring now to FIGS. 2 through 5, dataflow diagrams illustrate exemplary embodiments of the control module 40 of FIG. 1 used to control the steering system 12 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIGS. 2 through 5 can be combined and/or further partitioned to similarly estimate load on the steering system 12. As can be appreciated, the sub-modules shown in FIGS. 2 through 5 can be implemented as a single control module 40 (as shown) or multiple control modules (not shown). The implementation of the control module 40 will also vary based on the functions used in the model. Inputs to the control module 40 can be generated from the sensors of the vehicle 10 (FIG. 1), can be modeled within the control module 40 (e.g., by other sub-modules (not shown), can be received from other control modules (not shown), and/or can be predefined.

Figure 2:
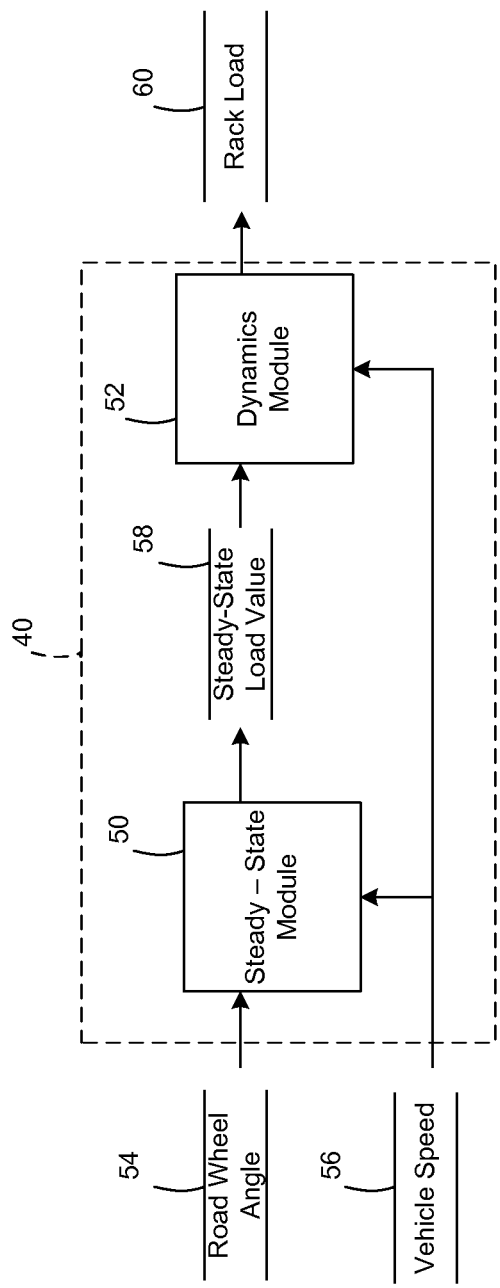
FIGS. 2 through 5 are dataflow diagrams illustrating exemplary steering control systems in accordance with various embodiments.

As shown in the example of FIG. 2, the control module 40 includes a steady-state module 50 and a dynamic module 52. The steady-state module 50 and the dynamic module 52 effectively separate the evaluation of the steady-state characteristics from the dynamic characteristics. The steady-state module 50 receives as input road wheel angle 54, and vehicle speed 56. In various embodiments, the vehicle speed 56 can be received from, for example, a sensor or can be communicated from another control module. In various embodiments, the road wheel angle 54 can be directly sensed, can be determined from hand wheel angle and the steer ratio, or can be determined from the motor position.

Figure 3:
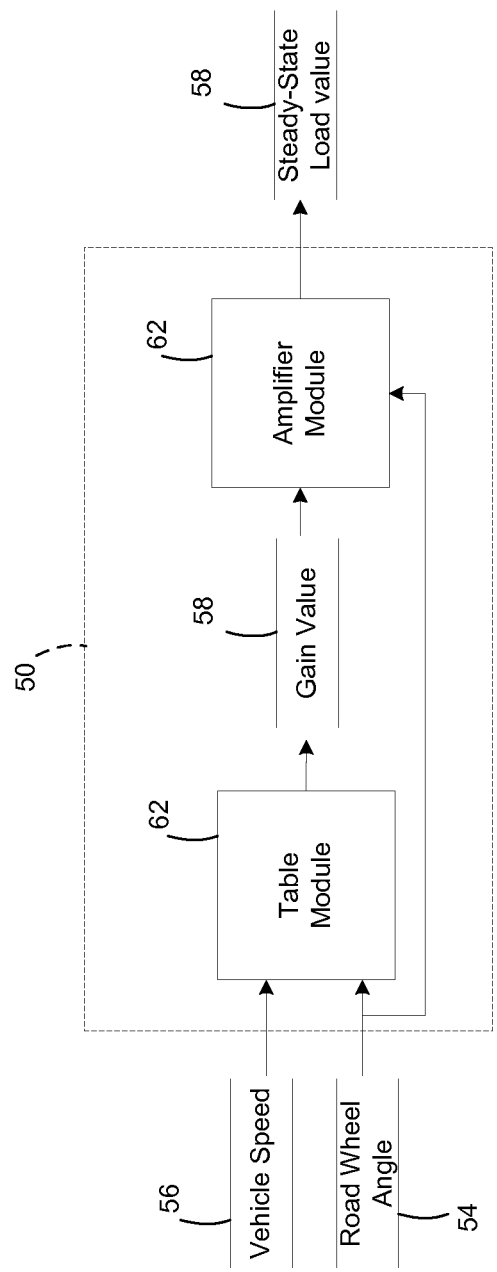

Based on the inputs, the steady-state module 50 determines a steady-state load value 58. In one example, as shown in FIG. 3, the steady-state module 50 includes a table sub-module 62, and an amplifier sub-module 63. The table sub-module 62 includes a steady-state look-up table. The steady-state look-up table defines a steady-state gain 65 for various road wheel angles and various vehicle speeds. Based on the current road wheel angle 54 and vehicle speed 56, the table sub-module 62 determines the steady-state gain 65 by interpolating the values in the steady-state look-up table.

The amplifier sub-module 63 receives as input the steady-state gain 65, and the road wheel angle 54. The amplifier sub-module 63 amplifies the road wheel angle 54 based on the steady-state gain 65 to obtain the steady-state output value 58. The steady-state output is effectively in load units.

In other embodiments, the steady-state module 50 can include only the table sub-module 62. The table sub-module 62 includes a steady-state look-up table. The steady-state look-up table defines a steady-state load 58 for various road wheel angles and various vehicle speeds. Based on the current road wheel angle 54 and vehicle speed 56, the table sub-module 62 determines the steady-state load value 58 by interpolating the values in the steady-state look-up table.

Referring back to FIG. 2, the dynamic module 52 receives as input the steady-state load value 58, and the vehicle speed 56. Based on the inputs, the dynamic module 52 adjusts the steady-state load based on a dynamic model of the vehicle 10 (FIG. 1).

Figure 4:
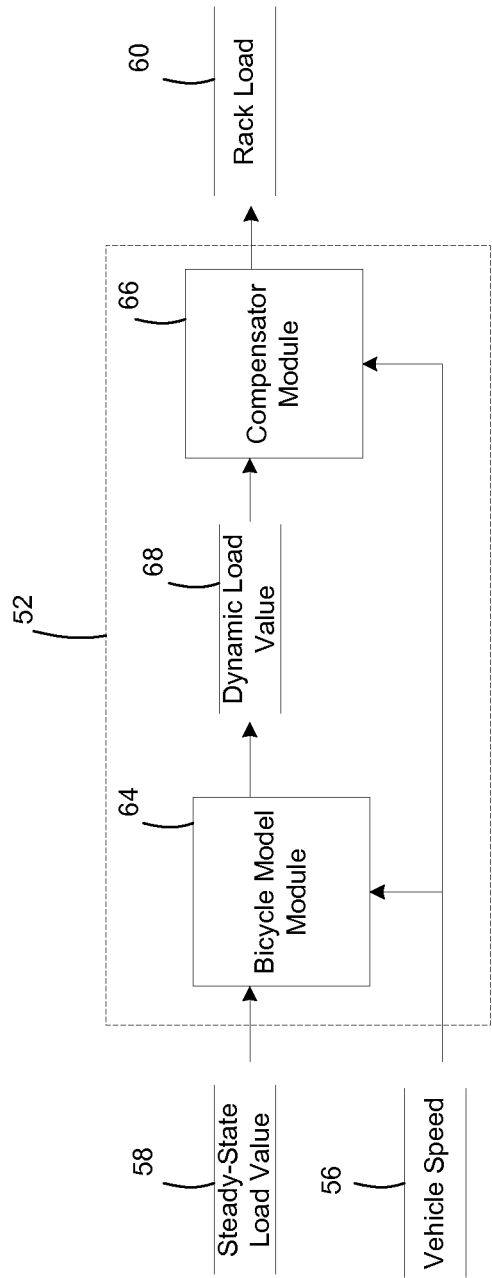

In one example, as shown in FIG. 4, the dynamic module 52 includes a bicycle model sub-module and a compensator sub-module. The bicycle model sub-module 64 includes a dynamic bicycle model of the vehicle 10 (FIG. 1). In various embodiments, the bicycle model is a normalized bicycle model. For example, the dynamic bicycle model performs gain attenuation with frequency and relevant phase characteristics to generate an uncompensated load value 68. The dynamics of the implemented bicycle model is a nonlinear function of vehicle speed 56.

Figure 5:
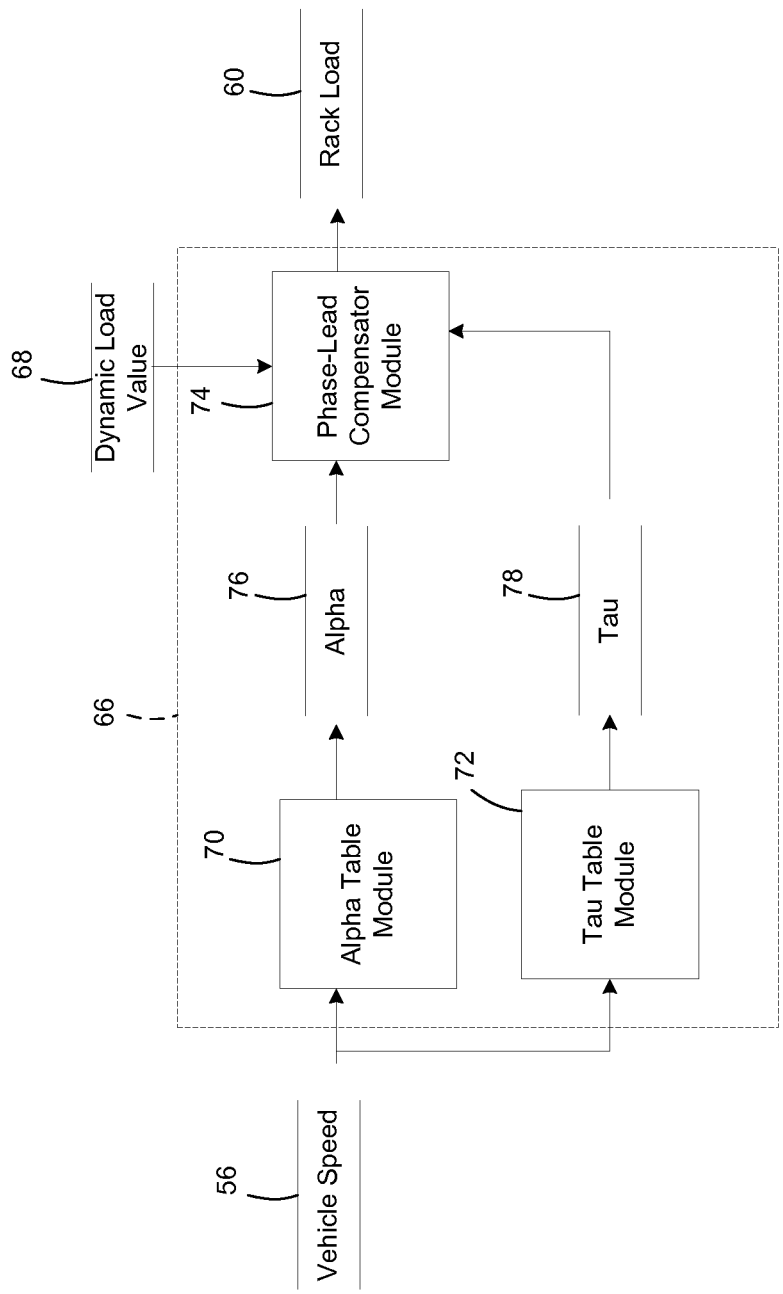

The compensator sub-module 66 adjusts any remaining phase characteristics to produce the final output namely, rack load 60. In one example, as shown in FIG. 5, the compensator sub-module 66 includes an alpha table sub-module 70, a tau table sub-module 72, and a phase-lead compensator sub-module 74. The alpha table sub-module 70 includes an alpha table. The alpha table defines the parameter α for various vehicle speeds. Based on the current vehicle speed 56, the alpha table sub-module determines the parameter α 76 by interpolating the values in the alpha table.

The tau table sub-module 72 includes a tau table. The tau table defines the parameter τ for various vehicle speeds. Based on the current vehicle speed 56, the tau table sub-module determines the parameter τ 78 by interpolating the values in the tau table. The phase-lead compensator sub-module 74 applies a phase lead compensator to the uncompensated load value 68 based on the parameters τ 78 and α 76.

As can be appreciated, the compensator sub-module 66 can be implemented according to various compensation techniques and is not limited to the present example.

Figure 6:
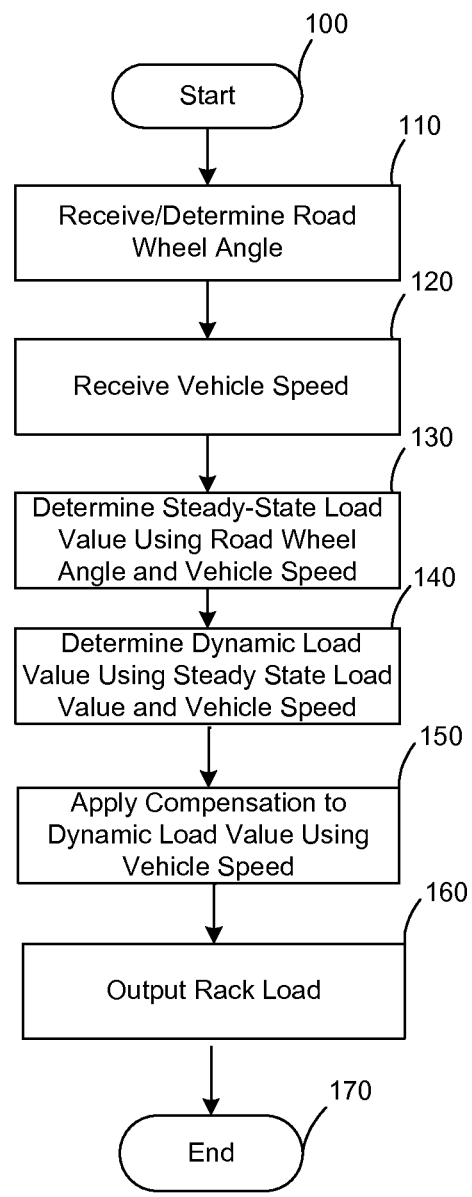
FIG. 6 is a flowchart illustrating an exemplary steering control method in accordance with various embodiments.

Referring now to FIG. 6 and with continued reference to FIGS. 2 through 5, a flowchart illustrates a steering control method that can be performed by the control module 40 of FIG. 1. As can be appreciated in light of the disclosure, the order of operation within the method is not limited to the sequential execution as illustrated in FIG. 6, but may be performed in one or more varying orders as applicable and in accordance with the present disclosure.

As can be appreciated, the steering control method can be scheduled to run based on predetermined events and/or can run at scheduled intervals during operation of the vehicle 10 (FIG. 1).

In one example, the method may begin at 100. The road wheel angle 54 is received or determined at 110. The vehicle speed 56 is received at 120. The steady-state load value 58 is determined based on the road wheel angle 54 and the vehicle speed 56 using, for example, the steady-state table at 130. The uncompensated load value 68 is determined based on the steady-state load value 58 and the vehicle speed 56, for example, as described above at 140. One or more compensation values 76, 78 are determined based on the vehicle speed 56 and applied to the uncompensated load value 68 at 150. Thereafter, the compensated dynamic load value is output for use as the estimated rack load 60 at 160. The method may end at 170.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of controlling a steering system, comprising:
   determining a gain based on a road wheel angle and a vehicle speed;
   estimating a steady-state load by amplifying the road wheel angle based on the gain;
   determining, by a control module comprising a processor coupled to a memory, a dynamic load on the steering system by adjusting the steady-state load based on a dynamic model; and
   controlling the steering system based on the dynamic load.

2. The method of claim 1 wherein the determining the gain comprises using a steady-state table that is defined by road wheel angles and vehicle speeds.

3. The method of claim 1 wherein the determining the dynamic load is based on a dynamic bicycle model of a vehicle.

4. The method of claim 1 wherein the adjusting the steady state load based on the dynamic model is further based on vehicle speed.

5. The method of claim 1 further comprising applying a compensation value to the adjusted steady-state load.

6. The method of claim 5 further comprising determining the compensation value based on a phase-lead compensator.

7. A control system for a steering system, comprising:
   a steady-state module comprising a processor coupled to a memory, the steady state module configured to determine a gain based on a road wheel angle and a vehicle speed and to estimate a steady-state load by amplifying the road wheel angle based on the gain; and
   a dynamics module comprising a processor coupled to a memory, the dynamic module configured to adjust the steady-state load based on a dynamic model to determine a dynamic load on the steering system, wherein the steering system is controlled based on the dynamic load.

8. The system of claim 7 wherein the steady-state module is configured to determine the gain by using a steady-state table that is defined by road wheel angles and vehicle speeds.

9. The system of claim 7 wherein the dynamic model is a dynamic bicycle model of a vehicle.

10. The system of claim 9 wherein the dynamic bicycle model is used to adjust the steady-state load based on vehicle speed.

11. The system of claim 7 wherein the dynamic module is configured to apply a compensation value to the adjusted steady-state load.

12. The system of claim 11 wherein the compensation value is determined based on a phase-lead compensator.

13. A vehicle, comprising:
    a steering system; and
    a control module comprising a processor coupled to a memory, the control module configured to:
       determine a gain based on a road wheel angle and a vehicle speed;
       estimate a steady-state load by amplifying the road wheel angle based on the gain;
       estimate a dynamic load on the steering system by adjusting the steady-state load based on dynamic model; and
       control the steering system based on the dynamic load.

14. The vehicle of claim 13 wherein the dynamic model is a dynamic bicycle model of a vehicle.

15. The vehicle of claim 13 wherein the control module is configured to estimate the dynamic load further based on vehicle speed.

16. The vehicle of claim 13 wherein the control module is configured to determine the gain by using a steady-state table that is defined by road wheel angles and vehicle speeds.

17. The vehicle of claim 13 wherein the control module is configured to apply a compensation value to the adjusted steady-state load.

18. The vehicle of claim 17 wherein the compensation value is determined based on a phase-lead compensator.

* * * * *